(12) United States Patent
Wang et al.

(10) Patent No.: US 10,050,968 B2
(45) Date of Patent: Aug. 14, 2018

(54) METHOD, APPARATUS, AND SYSTEM FOR ACCESS CONTROL OF SHARED DATA

(71) Applicant: SHENZHEN UNIVERSITY, Shenzhen, Guangdong (CN)

(72) Inventors: Bo Wang, Guangdong (CN); Jianyong Chen, Guangdong (CN); Jianping Yu, Guangdong (CN)

(73) Assignee: Shenzhen University, Shenzhen (CN)

( * ) Notice: Subject to any disclaimer, the term of this patent is extended or adjusted under 35 U.S.C. 154(b) by 159 days.

(21) Appl. No.: 15/024,379

(22) PCT Filed: Dec. 31, 2014

(86) PCT No.: PCT/CN2014/096064
§ 371 (c)(1),
(2) Date: Mar. 24, 2016

(87) PCT Pub. No.: WO2016/106752
PCT Pub. Date: Jul. 7, 2016

(65) Prior Publication Data
US 2016/0359856 A1    Dec. 8, 2016

(51) Int. Cl.
*H04L 29/06* (2006.01)
*H04L 29/00* (2006.01)
(Continued)

(52) U.S. Cl.
CPC ............ *H04L 63/10* (2013.01); *H04L 9/0894* (2013.01); *H04L 29/00* (2013.01); *H04L 63/0435* (2013.01); *H04L 67/1097* (2013.01)

(58) Field of Classification Search
CPC ....................................................... H04L 63/10
(Continued)

(56) References Cited

U.S. PATENT DOCUMENTS 7,353,388 B1 * 4/2008 Gilman .................. H04L 63/06
713/168
8,423,764 B2 * 4/2013 Amendola .............. H04L 9/088
713/158

(Continued)

FOREIGN PATENT DOCUMENTS

CN    102546764    7/2012
CN    102624522    8/2012
CN    103763319    4/2014

*Primary Examiner* — Harris C Wang
(74) *Attorney, Agent, or Firm* — Rankin, Hill & Clark LLP

(57) ABSTRACT

A method for access control of shared data includes a data access requester transmitting a request for accessing a shared data to a data storage dealer, obtaining a cipher text of the shared data, a cipher text of an encryption key, an access strategy, and a cipher text attribute component from the data storage dealer, and transmitting a request for obtaining the user attribute component of the data access requester respectively to the attribute authorizers. The attribute authorizers generate the user attribute components of the data access requester respectively and transmit the user attribute components of the data access requester to the data access requester. The data access requester restores the encryption key, and decrypts the cipher text of the shared data according to the encryption key for obtaining the shared data requested to be accessed.

9 Claims, 4 Drawing Sheets

(51) Int. Cl.
*H04L 9/08* (2006.01)
*H04L 29/08* (2006.01)

(58) Field of Classification Search
USPC .......................................................... 713/150
See application file for complete search history.

(56) References Cited

U.S. PATENT DOCUMENTS

| | | | | |
|---|---|---|---|---|
| 8,516,244 | B2* | 8/2013 | Waters | H04L 9/3073 |
| | | | | 713/155 |
| 8,594,332 | B2* | 11/2013 | Furukawa | H04L 9/3073 |
| | | | | 380/277 |
| 8,683,602 | B2* | 3/2014 | Waller | G06F 21/10 |
| | | | | 380/277 |
| 8,813,208 | B2* | 8/2014 | Blot-Lefevre | G06Q 20/02 |
| | | | | 709/227 |
| 8,891,772 | B2* | 11/2014 | D'Souza | H04L 9/0825 |
| | | | | 380/27 |
| 2009/0080658 | A1* | 3/2009 | Waters | G06F 21/6218 |
| | | | | 380/277 |
| 2010/0185861 | A1* | 7/2010 | Chase | H04L 9/083 |
| | | | | 713/171 |
| 2012/0155641 | A1* | 6/2012 | Vaikuntanathan | H04L 9/00 |
| | | | | 380/255 |
| 2013/0080765 | A1* | 3/2013 | Mohanty | H04L 63/0428 |
| | | | | 713/150 |
| 2016/0359856 | A1* | 12/2016 | Wang | H04L 29/00 |

\* cited by examiner ns for a same user. It can be seen that, due to the existence of the central identity verification authorizers, once the central identity verification authorizers are broken through, user attribute components can be filched easily, data decryp-

METHOD, APPARATUS, AND SYSTEM FOR ACCESS CONTROL OF SHARED DATA

TECHNICAL FIELD

The present application relates to the technical field of data security, and more particularly, relates to a method, apparatus, and system for access control of shared data.

BACKGROUND

The extent of data sharing indicates information developmental level of a region or a country, the higher the extent of data sharing, the higher the information developmental level. The implementation of data sharing enables more and more people to make full use of existing data resources, duplication of labor such as information collection and data sampling, and corresponding cost can be reduced; further, cloud storage provides data sharing with a more safe and effective platform. Cloud storage is a new concept extended and developed from the concept of cloud computing, and serves as a system which uses various functions such as cluster application, grid technology, distributed file system to cluster a large number of storage devices with different types in the network through application software, such that these storage devices cooperate with each other and provide data storage, business access function together to the external. A user can connect to the cloud at any time, at any place via any device that is capable of connecting to the Internet for accessing data conveniently.

Therefore, how to ensure security of shared data during data sharing and thereby prevent a cloud storage system or data within an information network from various threats, interferences and destruction has become an important aspect about research of cloud computing. Attribute-based Encryption (ABE) is a new type of public key encryption protocol being popular recently, which develops from the identification encryption method. As for attribute-based encryption, the identity of the user is described by series of attributes, a decryption can be done and a clear text can be obtained only when identity attribute of the user meets the access strategy defined by the system. This access control protocol further improves safety of shared data, and ensures the flexibility of data sharing. For example, different access rights can be opened to the user according to the identity attribute of the user and the value of the identity attribute, which is particularly good for access control of shared data in certain field. As a sample, taking an electronic medical record sharing system as an example, it is possible to set up hospitals qualified to be given some professional titles, only doctors who are in relevant domains and have pre-specified years of working ages are allowed to check medical records of the same category of patients. If access control strategy including a username and a password is adopted simply, effective access control for shared data is hard to be implemented.

However, the existing attribute-based encryption access control strategy needs a central identity verification authorizer, which works as a medium and verifies the identity of the user so as to provide different attribute authorizers with corresponding parameters, in this way, it is possible for different attribute authorizers provide user attribute components for a same user. It can be seen that, due to the existence of the central identity verification authorizers, once the central identity verification authorizers are broken through, user attribute components can be filched easily, data decryption can be further implemented, and data security would be reduced, meanwhile, the complexity of data sharing access control would be increased.

BRIEF SUMMARY

The purposes of embodiments of the present application aims at providing a method and system for access control of shared data, which is configured for solving the problem that in the prior art it is unable to provide an effective method for access control of shared data, and thus the data security is reduced and the complexity of access control of shared data increases.

In one aspect, the present invention provides a method for access control of shared data, which comprises steps in the following:

a data access requester transmitting an access request to a data storage dealer for accessing shared data;

the data access requester obtaining a cipher text of the shared data, a cipher text of an encryption key, an access strategy, and an cipher text attribute component corresponding to the shared data from the data storage dealer, the cipher text attribute component is a first number value, which characterizes an attribute of the data access requester, the encryption key is configured for encrypting the shared data;

the data access requester transmitting a request for obtaining user attribute component thereof respectively to K attribute authorizers relevant to the access strategy, the user attribute component is a second number value, which means that the data access requester owns an attribute corresponding to the second number value;

the K attribute authorizers generating user attribute components of the data access requester respectively when they receive the request for obtaining the user attribute component, and transmitting the user attribute component to the data access requester;

the data access requester restoring the encryption key according to the access strategy, the cipher text of the encryption key, the cipher text attribute component, and the user attribute component received by the data access requester;

the data access requester decrypting the cipher text of the shared data by using the encryption key, thereby obtaining the shared data requested for accessing.

In another aspect, the present invention provides an apparatus for access control of shared data, which comprises:

an access request transmitting unit configured for transmitting a request for accessing a shared data to a data storage dealer from a data access requester;

a data obtaining unit configured for obtaining a cipher text of the shared data, a cipher text of an encryption key, an access strategy, and a cipher text attribute component corresponding to the shared data from the data storage dealer for the data access requester, the cipher text attribute component is a first number value which characterizes the attribute of the data access requester, the encryption key is configured for encrypting shared data;

a data request transmitting unit configured for transmitting a request for obtaining user attribute component of the data access requester respectively to K attribute authorizers relevant to the access strategy, the user attribute component is a second number value, which means that the data access requester owns an attribute corresponding to the second number value;

a data returning unit configured for generating user attribute component of the data access requester respectively when the request for obtaining the user attribute component is received by the K attribute authorizers, and transmitting the user attribute component to the data access requester;

a secret key restoring unit configured for restoring the encryption key according to the access strategy, the cipher text of the encryption key, the cipher text attribute component, and the user attribute component received by the data access requester; and a data decrypting unit configured for decrypting the cipher text of the shared data through the encryption key used by the data access requester and thereby obtaining the shared data requested for accessing.

In another aspect, the present invention provides a system for access control of shared data, the system comprises a data access requester, attribute authorizers and a data storage dealer, wherein:

the data access requester is configured for transmitting an access request for accessing a shared data, and obtaining a cipher text of shared data, a cipher text of an encryption key, an access strategy, and a cipher text attribute component from the data storage dealer, which correspond to the shared data, the cipher text attribute component is a first number value which characterizes the attribute of the data access requester, the encryption key is configured for encrypting shared data;

the attribute authorizers are configured for generating a user attribute component of the data access requester respectively when a request for obtaining user attribute component sent out by the data access requester is received by the attribute authorizers, and transmitting the user attribute component to the data access requester;

the data storage dealer is configured for receiving the request for accessing the shared data from the data access requester, and returning the cipher text of the shared data, the cipher text of the encryption key, the access strategy, and the cipher text attribute component back to the data access requester;

the data access requester is also configured for restoring the encryption key according to the access strategy, the cipher text of the encryption key, the cipher text attribute component, and the user attribute component received by the data access requester, and decrypting the cipher text of the shared data by using the encryption key, thereby obtaining the shared data requested for accessing.

In the embodiments of the present invention, there is no need to set up a central identity verification authorization, each attribute authorizer authorizes and verifies the attribute of the user independently, thereby improving data security and further reducing the complexity of data sharing access control.

DETAILED DESCRIPTION OF THE PREFERRED EMBODIMENT

In order to make the purpose, the technical features, and the advantages of the present invention be clearer and more comprehensible, the present invention will be described clearly and completely with reference to the accompanying drawings and the embodiments of the present invention. It should be understand that the detailed embodiments described herein are only used for explaining the present invention, rather than limitation to the present invention.

Figure 1:
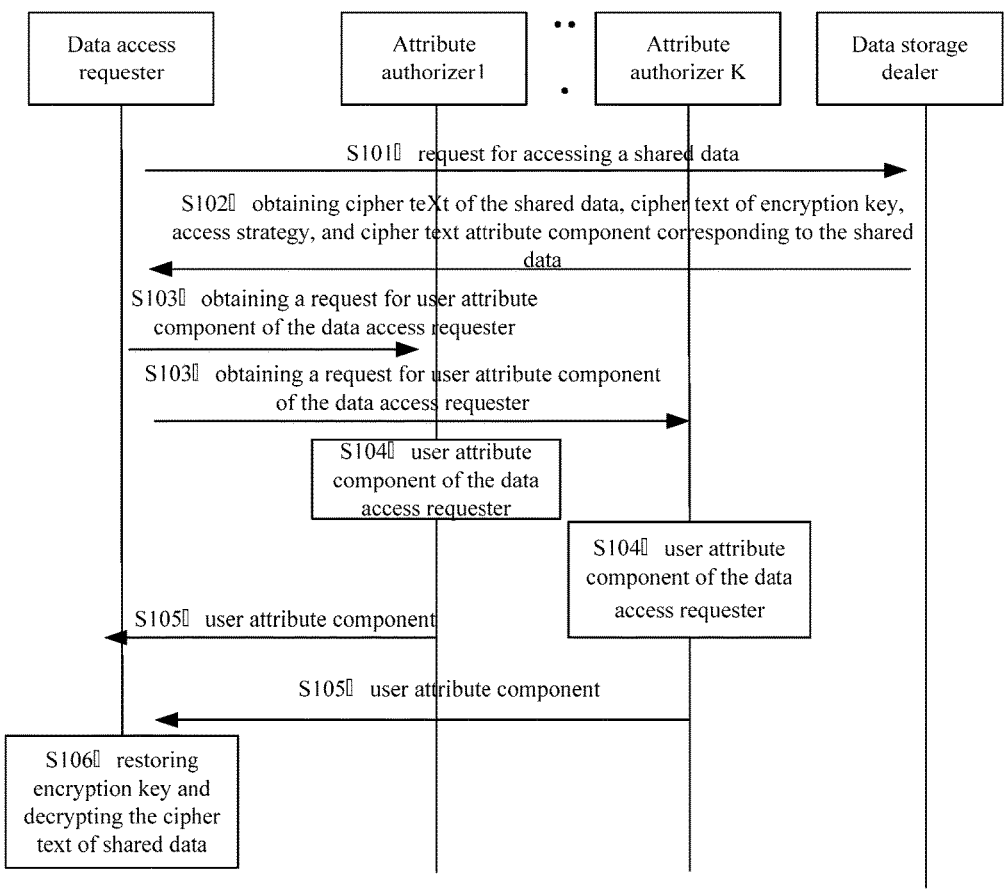
FIG. 1 illustrates an implementation flow chart of a method for access control of shared data provided by a first embodiment of the present invention.

The specific implementation of the present invention will be described in detail in combination with specified embodiments in the following:

Embodiment One:

FIG. 1 has shown an implementation flow of a method for access control of shared data provided by a first embodiment of the present invention, which is illustrated as follows:

in step S101, a data access requester transmits an access request for shard data to a data storage dealer.

In the embodiment of the present embodiment, the data storage dealer works for storing data shared by a storage user (i.e., data owner), and makes access control for the shared data according to an access strategy made by the user (i.e., the data owner). Preferably, the data storage dealer is a cloud storage server, which provides users with a cloud storage data sharing service.

In step S102, data access requester obtains a cipher text of shared data, a cipher text of an encryption key, the access strategy, and a cipher text attribute component corresponding shared data from the data storage dealer.

In the embodiment of the present invention, access control is made for the shared data on the basis of attribute, so that access control decision can be updated in time according to an attribute dynamic change of relevant entity/user, thereby providing an exquisite and more flexible method for access control. As sample, a user can have multiple attributes, for example, working department, professional title, working age, and so on. Based on user attribute, the data owner can set the access strategy when data is shared.

In the embodiment of the present invention, the access strategy refer to a tree-like logic structure capable of decrypting a series of attributes of cipher text, that is, an access strategy tree. The data owner can combine the series of attributes in the form of tree-like structure to form an access strategy. Leaf nodes of the tree-like structure are all word description of the attributes, non-leaf nodes refer to some "AND-OR gate" and "threshold gate". For example, {("the access requester is physician internist") or ("the access requester is a nurse") AND("the access requester has a working age of more than three years") AND ("The access requester works in hospital J")} is a tree-like access strategy, in this way, via tree-like logic structure with a series of attributes, those group of people who have the right to decrypt the encrypted shared data can be restrained within a certain scope. Wherein, AND (AND gate) refers to threshold gate of (K, K), OR (OR gate) refers to threshold gate of (I, K).

In the embodiment of the present invention, the cipher text attribute component is a number value which characterizes the attribute of the data access requester who requests for accessing the shared data, and is configured for restoring the encryption key of the cipher text of the shared data subsequently. The encryption key is configured for encrypting the shared data, and it is stored in the form of cipher text herein.

In step S103, the data access requester transmits a request for obtaining user attribute component of the data access requester respectively to K attribute authorizers who are relevant to the access strategy.

In the embodiment of the present invention, the user attribute component is a number value, meaning that the data access requester has the attribute relevant to the access strategy, being used with aforesaid cipher text attribute component for restoring encryption key of the shared data. The user attribute component is a number value which means that the data access requester has the attribute that is correspond to the number value.

In the embodiment of the present invention, the request for obtaining user attribute component of the data access requester includes a GUID (Globally Unique Identifier) of the data access requester, which is configured for identifying the identity of the user globally and uniquely, for example, a user name, and so on.

In the embodiment of the present invention, each attribute authorizer works for defining attributes, judging whether the data access requester has the defined attributes, and generating user attribute component for the data access requester. Since the access strategy is relevant to plural attributes, and these attributes can be managed by one or a plurality of attribute authorizer(s), the data access requester needs to transmit the request for user attribute component to K attribute authorizers respectively, the K attribute authorizers are those attribute authorizers of the attributes relevant (related) to the access strategy, wherein, K is a positive integer.

In the embodiment of the present invention, preferably, before the data access requester transmits the request for obtaining user attribute component to the attribute authorizers relevant to the access strategy, the request for obtaining user attribute component is digitally signed for preventing the data access requester from repudiation. In addition, the attribute authorizers can perform identity verification for the data access requester when they receive the request for obtaining user attribute component from the data access requester, for example, by using a traditional user name/password, a biological characteristic verification, and so on.

In the embodiment of the present invention, the attribute authorizers generate the decryption key respectively for the data access requester after they receive a request for obtaining decryption key of the data access requester. Specifically, each attribute authorizer generates a first hash value according to the GUID of the data access requester contained in the request for obtaining user attribute component, and generates a second hash value according to the identifier of the attribute of the data access requester, and generates the user attribute component according to the first hash value, the second hash value, and a pre-generated attribute master DEA key, wherein, the attribute master DEA key comprises two number values, in the embodiment of the present invention, the two number values are recorded to be a first parameter value and a second parameter value.

In the embodiment of the present invention, one or a plurality of preset attribute(s) managed by the attribute authorizers correspond(s) to a same attribute master DEA key, since the attribute master DEA keys are managed and stored by the attribute authorizers themselves, the requirement for storing the master DEA keys can be reduced under the circumstance that no concession is made for data security, meanwhile, the process for generating user attribute component can be simplified.

Preferably, as sample, the user attribute component of the data access requester can be generated by following formula:

$$uAc = H(\text{att})^a \cdot H(GID)^b \qquad \text{formula (1)}$$

wherein att represents identifier of attribute of the data access requester, H(att) represents the second hash value, H(GID) represents the first hash value, a and b represent two parameters of attribute master DEA key respectively.

In step S105, the attribute authorizers transmit the user attribute components generated respectively by themselves to the data access requester.

In step S106, the data access requester restores the encryption key from the user attribute components according to the access strategy, the cipher text of the encryption key, the cipher text attribute component, and the user attribute component received by the data access requester, and encrypts the cipher text of shared data by using the encryption key, so that shared data requested to be accessed can be obtained.

In the embodiment of the present invention, as mentioned earlier, the data access requester can receive the N user attribute components, and the M cipher text attribute components.

As sample, the data access requester can restore the encryption key according to the received data by following ways:

(1) regarding cipher text attribute components relevant to the leaf nodes of the access strategy tree of the access strategy and user attribute components relevant to a same attribute as an input of a bilinear mapping function so as to obtain the node correlation value of the leaf nodes.

(2) according to the hierarchical structure of the access strategy tree, starting from hierarchy of the leaf nodes of the access strategy tree, bottom-up, each hierarchy needs to be performed an inverse operation according to a preset secret shared function, regarding a correlation value of the hierarchy as the input, obtaining the node correlation value of the father node of the hierarchy by calculation. Keep performing the inverse operation of secretly shared function iteratively from bottom to up until a node correlation value of a root node of the access strategy tree is obtained finally, the correlation value is regarded as being a first intermediate recovery data.

(3) multiplying the first intermediate recovery data by the cipher text of the encryption key, thereby obtaining the encryption key. Afterwards, the data access requester decrypts the cipher text of the user data for obtaining shared data requested to be accessed.

In the embodiment of the present invention, there is no need to set up a central identification verification authorization, each attribute authorizer can give authorization about user attribute to the user independently, thereby increasing the security of the shared data and reducing complexity of data sharing access control at the same time.

In the embodiment of the present invention, before the data access requester obtains the cipher text of the shared data, the cipher text of the encryption key, the access strategy, and the cipher text attribute component corresponding to shared data, the owner of the shared data (i.e., data owner) should generate the cipher text of the encryption text and the cipher text attribute component according to the encryption key, an attribute public key, the second hash value, and the access strategy, with the purpose of taking control of access control of the shared data, and transmitting the cipher text of the encryption key, and the cipher text attribute component to the data storage dealer.

In the detailed implementing process, preferably, the cipher text of the encryption key can be generated by following formula:

$$K = \text{key} \cdot \hat{e}(g^a, H(\text{att}))^s \qquad \text{formula}(2)$$

wherein key represents the encryption key, ga represents the attribute public key, H(att) represents the second hash value, ê(.,.) represents the preset bilinear mapping function, s represents a random value, g represents a generator preset by the system.

The cipher text attribute component comprises three values, and preferably, the three values are calculated by the formulas in the following:

$$pAc1 = \hat{e}(g, g)^{s_x} \hat{e}(g_a, H(\text{att}))^{r_x} \qquad \text{formula (3)}$$

$$pAc2 = g^{b r_x + w_x} \qquad \text{formula (4)}$$

$$pAc3 = g^{r_x} \qquad \text{formula (5)}$$

wherein $s_x$ is a value which is obtained by performing the secret sharing function calculation for the random value s of the x node of the access strategy, $r_x$ represents another random value, $w_x$ represents a value obtained by performing the secret sharing function calculation for stable value o, the rest of the symbols in formula (3), formula (4) and formula (5) have the same meaning with the symbols in aforesaid formulas.

In the embodiment of the present invention, the data owner generates the cipher text of the encryption key and the cipher text attribute component according to the encryption key, the attribute public key, the second hash value, and the access strategy before sharing data, with the purpose of taking control of access control of shared data, thereby increasing the security of shared data and reducing complexity of data sharing access control.

In the embodiment of the present invention, the data access requester, the attribute authorizers, the data storage dealer, and the data owner can be a personal computer, a server, and so on, which serve for providing corresponding functionalities, and perform aforesaid steps according to corresponding hardware modules set forth above.

Figure 2:
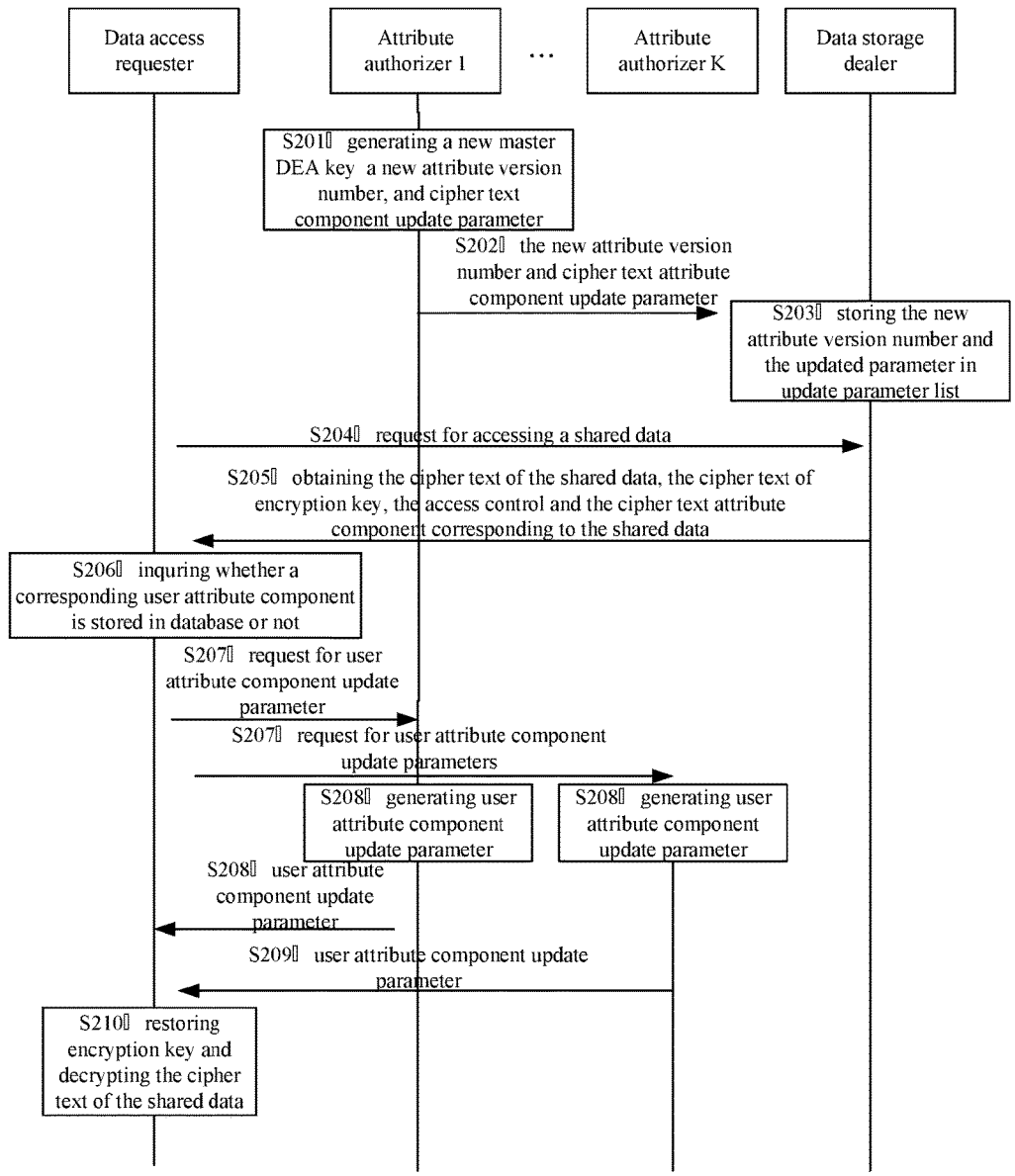
FIG. 2 illustrates an implementation flow chart of a method for access control of shared data provided by a second embodiment of the present invention.

Embodiment Two:

FIG. 2 has shown an implementation flow of a method for access control of shared data provided by a second embodiment of the present invention.

In step S201, the attribute authorizers generate a new attribute master DEA key and a new attribute version number according to the received attribute updating instruction, and generate a cipher text attribute component updating parameter according to the new attribute master DEA key and a stored original attribute master DEA key.

In the embodiment of the present invention, the stored original master DEA key is un-renewed, old attribute master DEA key. As mentioned before, the attribute master DEA key comprises two parameters, that is, the first parameter value and the second parameter value, renewal of the cipher text attribute component can be implemented by changing the two parameter values herein. As sample, the difference between the second parameter value of the new attribute master DEA key and the second parameter value of the stored attribute master DEA key can be regarded as being an update parameter of the cipher text attribute component. Specifically, the update parameter of the cipher text attribute component can be generated by a formula (6) in the following:

$$RK_{att} = b' - b \qquad \text{formula (6)}$$

Wherein b' represents the second parameter value of the new attribute master DEA key, b represents the second parameter of the original attribute master DEA key.

In step S202, the attribute authorizers transmit the new attribute version number and the update parameter of the cipher text attribute component to the data storage dealer.

In step S203, the data storage dealer stores the received new attribute version number and the update parameter of the cipher text attribute component in a pre-established update parameter list.

In this embodiment of the present invention, when an attribute of a user changes with the requirement of the management and time, the attribute authorizers can update the cipher text attribute component in time corresponding to the attributes managed by them, so that attribute authorization of the user can be adjusted in time, and a rapid recall of the attribute can be implemented. In the embodiment of the present invention, the data storage dealer pre-establishes an update parameter list for recording those various versions of the attributes under control and corresponding update parameters of the cipher text attribute components.

In step S204, the data access requester transmits a request for accessing shared data to the data storage dealer.

In step S205, the data requester obtains the cipher text of the shared data, the cipher text of the encryption key, the access strategy and the cipher text attribute component.

In this embodiment of the present invention, when the data storage dealer receives the request for obtaining the cipher text of shared data, the cipher text of the encryption key, the access strategy, and the cipher text attribute component corresponding to shared data, which is transmitted by the data access requester, the data storage dealer judges whether an attached attribute version number of the cipher text attribute component corresponding to the data access requester is the newest version number of the attribute or not according to the pre-stored update parameter list; if yes, the cipher text of shared data, the cipher text of the encryption key, the access strategy, and the cipher text attribute component corresponding to the shared data are returned back to the data access requester, if no, the cipher text attribute component corresponding to the data access requester is renewed to be the newest version according to the pre-stored update parameter list firstly, and then the cipher text of the shared data, the cipher text of the encryption key, the access strategy, and the renewed cipher text attribute component corresponding to the shared data are returned back the data access requester subsequently. In this way, the cipher text attribute component to the user is renewed only when the user requests for accessing the shared data, the load of the data storage dealer is reduced quite a lot.

In step S206, the data access requester inquires whether a corresponding user attribute component is stored in a preset user attribute component database or not according to the cipher text of the shared data, the cipher text of the encryption key, the access strategy, and the cipher text attribute component returned by the data storage dealer.

In the embodiment of the present invention, when the data access requester doesn't store the corresponding user attribute component, the data access requester obtains the user attribute components thereof respectively from the K attribute authorizers that are relevant to the access strategy, the implementation procedure of this process is stated above, therefore it is not repeated herein.

When the data access requester stores the corresponding user attribute component, the data access requester judges whether the version number relevant to the stored user attribute component is consistent with the version number relevant to the cipher text attribute component or not. If no, executing step S207; if yes, the data access requester restores the encryption key according to the received access strategy, the cipher text of the encryption key, the cipher text attribute component, and the stored user attribute component, and decrypts the cipher text of shared data so as to obtain the shared data requested to be obtained.

In step S207, the data access requester transmits the request for obtaining user attribute component update parameter to the attribute authorizer corresponding to the user attribute component which has an inconsistent version number.

In this embodiment of the present invention, when the attribute of the data access requester is updated, the previous user attribute component can't be used, it is necessary for the data access requester to obtain the user attribute component update parameter from the attribute authorizer corresponding to the user attribute component which has the inconsistent version number, and update its user attribute component via the user attribute component update parameter.

In step S208, the attribute authorizers generate the user attribute component update parameters respectively when they receive the request for obtaining user attribute component update parameter.

In the embodiment of the present invention, the attribute authorizers generate the first hash value according to the GID (Globally Unique Identifier) of the data access requester, and generate the user attribute component update parameter according to the first hash value, the second hash value of the new attribute master DEA key, and the second parameter value of the stored attribute master. Specifically, the user attribute component update parameter can be generated according to formula (7) in the following:

$$RK_{GID,att} = H(GID)^{b'-b} \quad \text{formula (7)}$$

Wherein in regard to the meaning of every parameter, please refer to aforesaid description, it is not repeated herein.

In the embodiment of the present invention, user attribute component update parameter is inconsistent with every data access requester, therefore, the data access requester can't share the update parameter, so that the security of the shared data is increased.

In step S209, the attribute authorizers transmit the respectively generated user attribute component update parameter to the data access requester.

In step S210, the data access requester restores the encryption key according to the received access strategy, the cipher text of the encryption key, the cipher text attribute component, the user attribute component update parameter, and the stored original user attribute component, and decrypts the cipher text of shared data by using the encryption key for obtaining the shared data requested to be obtained.

In the embodiment of the present invention, there is no need to set up a central identity verification authorization, each attribute authorizer authorizes and verifies the attribute of the user independently, thereby improving the data security and reducing the complexity of data sharing access control.

Figure 3:
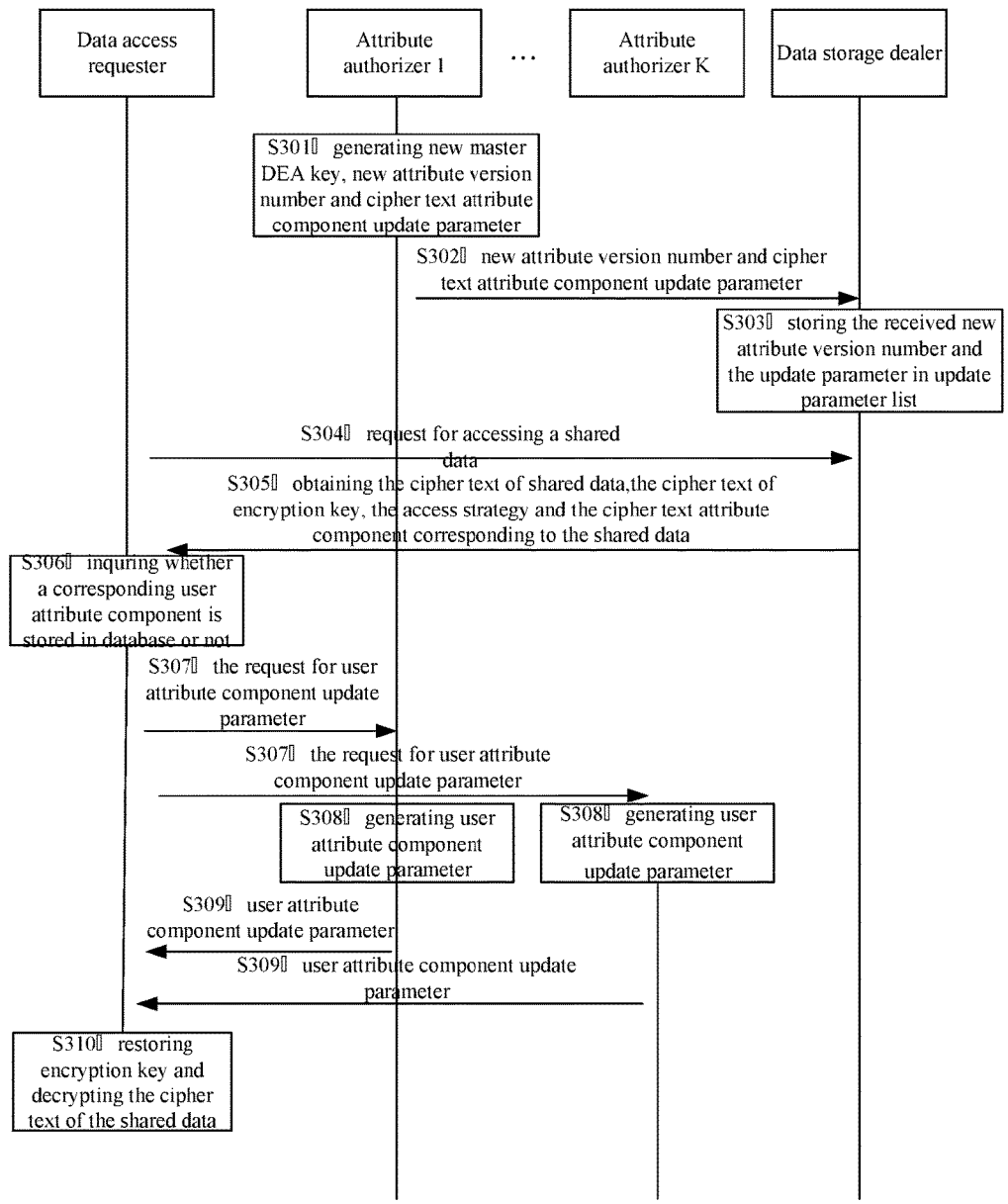
FIG. 3 illustrates an implementation flow chart of a method for access control of shared data provided by a third embodiment of the present invention.

Embodiment Three:

FIG. 3 has shown an implementation flow of a method for access control of shared data provided by a third embodiment of the present invention, which is illustrated in detail as follows.

In step S301, the attribute authorizer generates a new attribute master DEA key and a new attribute version number according to the received attribute updating instruction, and generates a second hash value according to the identifier of the attribute of the data access requester, and generates the cipher text component updating parameter according to the second hash value, the new attribute master DEA key, and the stored original attribute master DEA key.

In this embodiment of the present invention, when attribute updating instruction is received, a first parameter value of a new attribute master DEA key and a new attribute version number can be generated, the second hash value can be generated according to the identifier of the attribute of the data access requester, the cipher text attribute component update parameter can be generated according to the second hash value, the first parameter of the new attribute master DEA key, and the first parameter value of the stored original attribute master DEA key. Specifically, the cipher text attribute component update parameter can be generated by formula (8) in the following:

$$RK_{att} = H(att)^{a'-a} \quad \text{formula (8)}$$

Wherein a' represents the first parameter of the new attribute master secret key, a represents the first parameter of the original attribute master DEA key.

In step S302, the attribute authorizers transmit the new attribute version number and the cipher text attribute component update parameter to the data storage dealer.

In step S303, the data storage dealer stores the received new attribute version number and the cipher text attribute component update parameter in the pre-established update parameter list.

In the embodiment of the present invention, when the attribute of the user (e.g., the data access requester) changes with the requirement of management, time, and so on, the attribute authorizers can perform an updating operation in time for the attribute managed by them, thereby adjusting attribute authorization of the user in time and implementing rapid recall of attribute. In the embodiment of the present invention, the data storage dealer pre-establishes a new parameter list with the purpose of recording various versions of the managed attributes and the update parameter corresponding to the various versions of the managed attributes.

In step S304, the data access requester transmits a request for accessing shared data to the data storage dealer.

In step S305, the data access requester obtains the cipher text of shared data, the cipher text of the encryption key, the access strategy and the cipher text attribute component from the data storage dealer.

In this embodiment of the present invention, the data storage dealer judges whether an attached attribute version number of the cipher text attribute component corresponding to the data access requester is the newest version number of the attribute or not according to the pre-stored update parameter list when the data storage dealer receives the request for obtaining the cipher text of the shared data, the cipher text of the encryption key, the access strategy, and the cipher text attribute component corresponding to the shared data, which is transmitted by the data access requester, if yes, retuning the cipher text of the shared data, the cipher text of the encryption key, the access strategy, and the cipher text attribute component corresponding to the shared data back to the data access requester, if no, the cipher text attribute component corresponding to the data access requester is renewed to be the newest version according to the pre-stored update parameter list firstly, and then the cipher text of the shared data, the cipher text of the encryption key, the access strategy, the renewed cipher text attribute component corresponding to the shared data are returned back to the data access requester subsequently. In this way, the cipher text attribute component of the user can be renewed only when the user requests for accessing the shared data, the load of the data storage dealer is reduced quite a lot.

In step S306, the data access requester inquires whether corresponding user attribute component is stored in a preset user attribute component database or not according to the cipher text of the shared data, the cipher text of the encryption key, the access strategy, and the cipher text attribute component returned by the data storage dealer.

In the embodiment of the present invention, when the data access requester doesn't store corresponding user attribute component, the data access requester obtains the user attribute components thereof respectively from the K attribute authorizers that are relevant to the access strategy, the implementation procedure of this process is stated above, therefore it is not repeated herein.

When the data access requester stores the corresponding user attribute component, the data access requester judges whether the version number relevant to the stored user attribute component is consistent with the version number relevant to the cipher text attribute component or not. If no, executing step S307, if yes, the data access requester restores the encryption key according to the received access strategy, the cipher text of the encryption key, the cipher text attribute component, and the stored user attribute component, and decrypts the cipher text of the shared data so as to obtain the shared data requested to be obtained.

In step S307, the data access requester transmits the request for obtaining the user attribute component update parameter to the attribute authorizer which is corresponding to the user attribute component having an inconsistent version number.

In the embodiment of the present invention, when the attribute of the data access requester is updated, previous user attribute component can't be used, it is necessary for the data access requester to obtain the user attribute component update parameter from the attribute authorizer corresponding to the user attribute component which has inconsistent version number, and update its user attribute component according to the user attribute component update parameter.

In step S308, the attribute authorizers generate the user attribute component update parameter respectively when they receive the request for obtaining user attribute component update parameter.

In the embodiment of the present invention, a first parameter value of a new attribute master DEA key and a new attribute version number can be generated, a second hash value can be generated according to the identifier of the attribute of the data access requester, an user attribute component update parameter can be generated according to the second hash value, the first parameter value of the new attribute master DEA key, and the first parameter value of the stored original attribute master DEA key, specifically, the user attribute component update parameter can be generated by formula (9) in the following:

$$RK_{GID,att} = H(att)^{a'-a} \quad \text{formula (9)}$$

Wherein in regard to the meaning of every parameter, please refer to aforesaid description, therefore it is not repeated herein.

In the embodiment of the present invention, the user attribute component update parameters for every data access requester are consistent, so that the attribute authorizers' computational work for generating user attribute component update parameter can be reduced and computational efficiency can be improved.

In step S309, the attribute authorizers transmit the respectively generated user attribute component update parameter to the data access requester.

In step S310, the data access requester restores the encryption key according to the received access strategy, the cipher text of the encryption key, the cipher text attribute component, the user attribute component update parameter, and the stored original user attribute component, and decrypts the cipher text of the shared data by using the encryption key for obtaining the shared data requested to be obtained.

In the embodiment of the present invention, there is no need to set up a central identity verification authorization, each attribute authorizer authorizes and verifies the attribute of the user independently, thereby improving the data security and reducing the complexity of data sharing access control.

It can be understandable for those skilled in the art that part or all of the procedures for implementing the method in the aforesaid embodiment can be accomplished by instructing relevant hardware via procedures, the procedures can be stored in a computer readable storage medium, the storage medium can be, such as ROM (Read Only Memory)/RAM (Random Access Memory), magnetic disk, optical disk, and so on.

Figure 4:
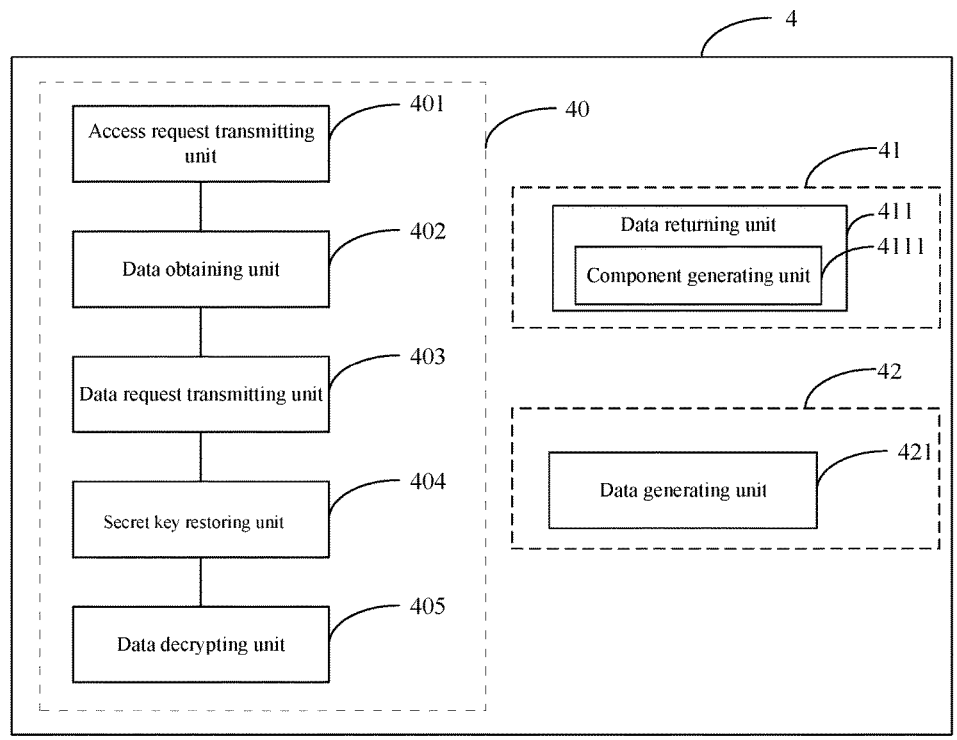
FIG. 4 illustrates a structural block diagram of an apparatus for access control of shared data provided by a fourth embodiment of the present invention.
Figure 5:
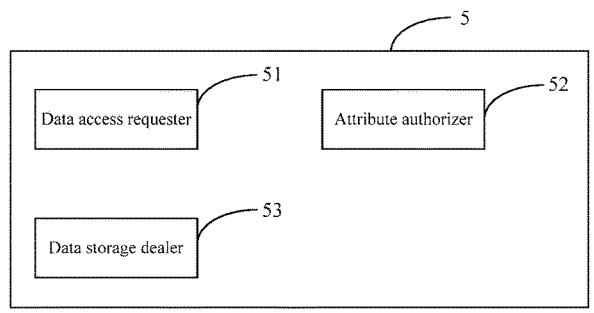
FIG. 5 illustrates a structural block diagram of a system for access control of shared data provided by a fifth embodiment of the present invention.

Embodiment Four:

FIG. 4 has shown a structure of an apparatus for access control of shared data provided by a fourth embodiment of the present invention, in order to explain conveniently, only those parts relevant to the embodiment of the present invention are illustrated, the apparatus for access control of shared data comprises:

an access request transmitting unit 401 configured for transmitting a request for accessing shared data to a data storage dealer from a data access requester;

a data obtaining unit 402 configured for obtaining a cipher text of the shared data, a cipher text of an encryption key, an access strategy, and a cipher text attribute component corresponding to the shared data from the data storage dealer for the data access requester, the cipher text attribute component is a first number value which characterizes an attribute of the data access requester, the encryption key is configured for encrypting the shared data;

a data request transmitting unit 403 configured for transmitting a request for obtaining user attribute component of the data access requester respectively to K attribute authorizers relevant to the access strategy, the user attribute component is a second number value, which means that the data access requester owns an attribute corresponding to the second number value;

a data returning unit 411 configured for respectively generating user attribute component of the data access requester when a request for obtaining the user attribute component is received by the K attribute authorizers, and transmitting the user attribute component to the data access requester;

a secret key restoring unit 404 configured for restoring the encryption key according to the access strategy, the cipher text of the encryption key, the cipher text attribute component, and the user attribute component received by the data access requester; and a data decrypting unit 405 configured for obtaining the shared data requested for accessing for the data access requester by decrypting the cipher text of the shared data via the encryption key.

As sample, the access request transmitting unit 401, the data obtaining unit 402, the data request transmitting unit 403, the secret key restoring unit 404, and the data decrypting unit 405 are configured within a data access requester 40, the data returning unit 411 is configured within the attribute authorizers 41.

In one embodiment of the present invention, as sample, the data returning unit 411 may comprises a component generating unit 4111 configured for generating a first hash value according to a unique global identifier of the data access requester contained in the request for obtaining the user attribute component, generating a second hash value according to an identifier of the attribute of the data access requester, and generating the user attribute component according to the first hash value, the second hash value, and a pre-generated attribute master DEA key for each attribute authorizer. Wherein, there is/are one or a plurality of preset attribute(s) managed by the attribute authorizers, which is/are corresponding to a same attribute master DEA key.

Further, in one embodiment of the present invention, the apparatus for access control of the shared data further comprises a data generating unit 421 configured for generating the cipher text of the encryption key and the cipher text attribute component according to the encryption key, an attribute public key, the second hash number value, and the access strategy, and transmitting the cipher text of the encryption key, and the cipher text attribute component to the data storage dealer. As sample, the data generating unit 421 can be arranged within a data owner 42.

In the embodiment of the present invention, in regard to the implementation method for each unit within the apparatus 4 for access control of the shared data, please refer to the implementation of corresponding procedures illustrated in embodiment one, and is not repeated herein.

In the embodiment of the present invention, each of the data access requester, the attribute authorizers, the data storage dealer, and the data owner can be, for example, a personal computer, a server, and so on, which is configured for providing corresponding functionalities; however, the aforesaid units can be a function unit or a hardware unit within the personal computer or the server, which executes the functionalities according to corresponding hardware.

Embodiment Five:

Figure five has shown a structure of a system 5 for access control of shared data provided by a fifth embodiment of the present invention, in order to explain conveniently, only those parts relevant to the embodiment of the present invention is illustrated, comprising:

the system 5 for access control of shared data comprises a data access requester 51, attribute authorizers 52 and a data storage dealer 53, wherein:

the data access requester 51 is configured for transmitting an access request for accessing shared data, and obtaining a cipher text of shared data, a cipher text of an encryption key, an access strategy, and a cipher text attribute component corresponding to the shared data from the data storage dealer 53, the cipher text attribute component is a first number value which characterizes the attribute of the data access requester 51, the encryption key is configured for encrypting the shared data;

the attribute authorizers 52 are configured for generating a user attribute component of the data access requester 51 respectively when receiving a request for obtaining user attribute component sent out by the data access requester 51, and transmitting the user attribute component to the data access requester 51;

the data storage dealer 53 is configured for receiving the request for accessing the shared data from the data access requester, and returning the cipher text of the shared data, the cipher text of the encryption key, the access strategy, and the cipher text attribute component corresponding to the shared data back to the data access requester 51;

the data access requester 51 is also configured for restoring the encryption key according to the access strategy, the cipher text of the encryption key, the cipher text attribute component, and the user attribute component received by it, and decrypting the cipher text of shared data by using the encryption key, thereby obtaining the shared data requested for accessing.

In one embodiment of the present invention, the system 5 further comprises a data owner 50, the data owner 50 generates the cipher text of the encryption key and the cipher text attribute component according to the encryption key, a public key, a second hash value, and the access strategy, and transmits the cipher text of the encryption key, and the cipher text attribute component to the data storage dealer 53.

In the embodiment of the present invention, there is no need to set up a central identity verification authorization, each attribute authorizer authorizes and verifies the attribute of the user independently, thereby improving the data security and reducing the complexity of data sharing access control.

The aforesaid description are only some preferable embodiments of the present invention, which should not be regard as being limitation to the present invention, whenever, any modification, equivalent replacement, and so on, which is made within the scope of the spirit and the principle of the present invention, should fall within the protection scope of the present invention.

The invention claimed is:

1. A method for access control of shared data in an apparatus for access control of shared data comprising a computer readable storage medium and a processor configured to execute software programs stored in the storage medium in the form of software units, the method comprising:

pre-establishing, by a data storage dealer, an update parameter list for recording those various versions of attributes under control and corresponding update parameters of cipher text attribute components;

generating, by attribute authorizers, a new attribute master DEA key and a new attribute version number according to the received attribute component updating parameter according to the new attribute master DEA key and a stored original attribute master DEA key;

transmitting, by the attribute authorizers, the new attribute version number and the update parameter of the cipher text attribute component to a data storage dealer;

storing, by the storage dealer, the received new attribute version number and the update parameter of the cipher text attribute component in the pre-established update parameter list;

transmitting, from a data access requester, an access request to a data storage dealer for accessing a shared data;

obtaining, from the data storage dealer, a cipher text of the shared data, a cipher text of an encryption key, an access strategy, and a cipher text attribute component corresponding to the shared data from the data storage dealer, the cipher text attribute component is a first number value, which characterizes an attribute of the data access requester, the encryption key is configured for encrypting the shared data;

inquiring, by the data access requester, whether a corresponding user attribute component is stored in a preset user attribute component database or not according to the cipher text of the shared data, the cipher text of the encryption key, the access strategy, and the cipher text attribute component returned by the data storage dealer;

when the data access requester does not store the corresponding user attribute component, transmitting from the data access requester a request for obtaining user attribute component thereof respectively to K attribute authorizers relevant to the access strategy, the user attribute component is a second number value, which means that the data access requester owns an attribute corresponding to the second number value;

generating, via the K attribute authorizers, the user attribute components of the data access requester respectively when the K attribute authorizers receive the request for obtaining the user attribute component, and transmitting the user attribute component to the data access requester;

restoring, via the data access requester, the encryption key according to the access strategy, the cipher text of the encryption key, the cipher text attribute component, and the user attribute component received by the data access requester;

decrypting, via the data access requester, the cipher text of the shared data by using the encryption key, thereby obtaining the shared data requested for accessing.

2. The method according to claim 1, wherein generating the user attribute components of the data access requester comprises:

generating a first hash value according to a unique global identifier of the data access requester contained in the request for obtaining the user attribute component, generating a second hash value according to an identifier of the attribute of the data access requester, and generating the user attribute component according to the first hash value, the second hash value, and a pre-generated attribute master DEA key.

3. The method according to claim 2, wherein one or a plurality of preset attributes which are managed by the attribute authorizer correspond to a same attribute master DEA key.

4. The method according to claim 1, wherein before obtaining the cipher text of the shared data, the cipher text of the encryption key, the access strategy, and the cipher text attribute component corresponding to the shared data from the data storage dealer, the method further comprises:

generating the cipher text of the encryption key and the cipher text attribute component according to the encryption key, an attribute public key, a second hash number value, and the access strategy, and transmitting the cipher text of the encryption key, the cipher text attribute component to the data storage dealer.

5. The method according to claim 1, further comprising:
judging, by the data access requester, whether the version number relevant to the stored user attribute component is consistent with the version number relevant to the cipher text attribute component when the data access requester stores the corresponding user attribute component;

if yes, storing, by the data access requester, the encryption key according to the received access strategy, the cipher text of the encryption key, the cipher text attribute component, and the stored user attribute component, and decrypting, by a data decrypting unit, the cipher text of shared data so as to obtain the shared data requested to be obtained;

if no, transmitting, by the data access requester, the request for obtaining user attribute component update parameter to the attribute authorizer corresponding to the user attribute component which has an inconsistent version number.

6. The method according to claim 1, further comprising:
updating, by the attribute authorizers, the cipher text attribute component in time corresponding to the attributes managed by the attribute authorizers when an attribute of a user changes with the requirement of the management and time.

7. The method according to claim 1, further comprising:
signing the request for obtaining user attribute component digitally before transmitting the request for obtaining user attribute component to the attribute authorizers relevant to the access strategy.

8. The method according to claim 7, further comprising:
performing, by the attribute authorizers, identity verification for the data access requester when they receive the request for obtaining user attribute component from the data access requester.

9. The method according to claim 1, wherein the access strategy is referred to as a tree-like logic structure capable of decrypting a series of attributes of cipher text, that is, an access strategy tree, a step of restoring, via the data access requester, the encryption key according to the access strategy, the cipher text of the encryption key, the cipher text attribute component, and the user attribute component received by the data access requester specifically comprises:

regarding cipher text attribute components relevant to the leaf nodes of the access strategy tree of the access strategy and user attribute components relevant to a same attribute as an input of a bilinear mapping function so as to obtain the node correlation value of the leaf nodes;

according to the hierarchical structure of the access strategy tree, starting from hierarchy of the leaf nodes of the access strategy tree, bottom-up, an inverse operation needs to be performed for each hierarchy according to a preset secret shared function, regarding a correlation value of the hierarchy as the input, obtaining the node correlation value of the father node of the hierarchy by calculation, keeping performing the inverse operation of secretly shared function iteratively from bottom to up until a node correlation value of a root node of the access strategy tree is obtained finally, wherein the correlation value is regarded as being a first intermediate recovery data; and obtaining the encryption key by multiplying the first intermediate recovery data by the cipher text of the encryption key.

* * * * *